United States Patent
Na

(10) Patent No.: US 9,387,745 B2
(45) Date of Patent: Jul. 12, 2016

(54) APPARATUS FOR OPENING/CLOSING COVER FOR ELECTRIC CURTAIN

(71) Applicant: Hyundai Motor Company, Seoul (KR)

(72) Inventor: Won Young Na, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/561,006

(22) Filed: Dec. 4, 2014

(65) Prior Publication Data

US 2015/0321541 A1    Nov. 12, 2015

(30) Foreign Application Priority Data

May 12, 2014    (KR) ..................... 10-2014-0056400

(51) Int. Cl.
 *E06B 9/24* (2006.01)
 *B60J 1/20* (2006.01)
 *E05F 15/603* (2015.01)

(52) U.S. Cl.
 CPC ............. *B60J 1/2011* (2013.01); *E05F 15/603* (2015.01); *E06B 9/24* (2013.01)

(58) Field of Classification Search
 CPC ............. B60J 3/00; B60J 3/02; B60J 7/0015; B60J 1/2019; B60J 1/2036; B60J 1/2038
 USPC .................. 160/22, 23.1, 265, 370.21–370.23
 See application file for complete search history.

(56) References Cited

U.S. PATENT DOCUMENTS

| | | | | |
|---|---|---|---|---|
| 5,423,588 A * | 6/1995 | Eglinton | ................... | B60J 7/085 224/324 |
| 6,796,599 B2 * | 9/2004 | Schlecht | ................ | B60J 1/2027 160/370.22 |
| 7,089,992 B2 * | 8/2006 | Walter | ................... | B60J 1/2027 160/370.22 |
| 8,215,697 B1 * | 7/2012 | Lin | ......................... | B60J 1/2027 160/23.1 |
| 2004/0012225 A1 * | 1/2004 | Schlecht | ................ | B60J 1/2027 296/143 |
| 2004/0144506 A1 * | 7/2004 | Walter | ................... | B60J 1/2027 160/370.22 |
| 2007/0144689 A1 * | 6/2007 | Walter | ................... | B60J 1/2027 160/370.22 |
| 2011/0036515 A1 * | 2/2011 | Lin | ......................... | B60J 1/2019 160/238 |
| 2011/0080022 A1 * | 4/2011 | Uehara | .................. | B60J 7/0015 296/216.04 |

FOREIGN PATENT DOCUMENTS

| | | |
|---|---|---|
| JP | 2010-201956 A | 9/2010 |
| JP | 2011-105152 | 6/2011 |
| JP | 2012-126289 | 7/2012 |
| JP | 2012-240576 A | 12/2012 |
| KR | 10-0792544 | 1/2008 |
| KR | 10-0794522 | 1/2008 |

* cited by examiner

*Primary Examiner* — David E Allred
*Assistant Examiner* — Scott Denion
(74) *Attorney, Agent, or Firm* — Morgan, Lewis & Bockius LLP

(57) ABSTRACT

An apparatus for opening/closing a cover for an electric curtain, may include a driving device for the electric curtain mounted at a lower part of a withdrawal aperture of a rear package tray, wherein the cover is openably/closably mounted on the withdrawal aperture of the rear package tray; and a cover opening/closing unit disposed between the cover and a drive shaft of the driving device, allowing the cover to be opened or closed simultaneously with a driving of the driving device.

5 Claims, 10 Drawing Sheets

- CLOSED -

- OPENING TRAJECTORY -

APPARATUS FOR OPENING/CLOSING COVER FOR ELECTRIC CURTAIN

CROSS-REFERENCE TO RELATED APPLICATION

The present application claims the benefit of Korean Patent Application No. 10-2014-0056400 filed on May 12, 2014, the entire contents of which is incorporated herein for all purposes by this reference.

BACKGROUND OF THE INVENTION

1. Field of the Invention

The present invention relates to an apparatus for opening/closing a cover for an electric curtain. More particularly, it relates to an apparatus for opening/closing a cover for an electric curtain, which can cover an upper profile of the electric curtain installed in a rear package tray of a vehicle to improve the exterior beauty.

2. Description of Related Art

Generally, an electric curtain for a vehicle is one of equipment for convenience that blocks out light incident through a door glass or a rear glass.

The electric curtain for the rear glass is installed at a rear tray, i.e., a rear package tray of a rear seat, and is usually divided into a link-type and a wire-type.

In this case, a withdrawal aperture is penetratively formed in the rear package tray for the rise and fall of a curtain sheet.

As shown in FIG. 1, the link-type electric curtain is configured to include a driving device 20 mounted at a lower part of the rear package tray, an upper frame 12 coupled to an upper end portion of a curtain sheet 10, and a multi joint link 14 connected between the driving device 20 and the upper frame 12.

Accordingly, as a motor of the driving device 20 rotates, the multi joint link 14 spreads out in a straight line, and simultaneously, the upper frame 12 connected to the multi joint link 14 rises, allowing the curtain sheet 10 integrated with the upper frame 12 to rise through an withdrawal aperture of the rear package tray and simultaneously to spread out while covering a rear glass.

As shown in FIG. 2, the wire-type electric curtain is configured to include a driving device 20 mounted at a lower part of the rear package tray, an upper frame 12 coupled to an upper end portion of a curtain sheet 10, a guide rail 16 inserted into both side ends of the upper frame 12, and a wire 18 connected between the driving device 20 and the upper frame 12.

Accordingly, as a motor of the driving device 20 is operated, the wire 18 circulates, and simultaneously, the upper frame 12 is pulled in an upward direction, allowing the curtain sheet 10 integrated with the upper frame 12 to rise through a withdrawal aperture of the rear package tray and simultaneously to spread out while covering a rear glass.

However, when the link- and wire-type electric curtains are not operated (in falling state), as shown in FIG. 3 and FIG. 4, the upper frame 12 integrally connected to the upper end of the curtain sheet is intactly exposed through the withdrawal aperture 32 of the rear package tray 30, reducing the exterior beauty.

Also, since the rear package tray 30 needs to be installed with a two-piece structure in which the front and rear sides are divided based on the withdrawal aperture 32 and the upper frame 12 is seated in the withdrawal aperture 32 of the rear package tray 30, the number of parts may increase.

Furthermore, in case of the link-type of electric curtain as shown in FIG. 3, since a roller withdrawal part 34 having a V-shape is separately needed to withdraw a roller mounted at both side ends of the upper frame 12, its structure may become complicated. Also, in case of the wire-type of electric curtain as shown in FIG. 4, since the guide rail 16 needs to be separately installed to guide the rising and falling trajectory at both side ends of the upper frame 12, its structure becomes complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for opening/closing a cover for an electric curtain, which can improve the exterior beauty, by allowing an upper frame of the electric curtain not to be exposed to the outside using the cover for the electric curtain, which is opened/closed simultaneously with the driving of the electric curtain and is equipped in a withdrawal aperture of a rear package tray.

In an aspect of the present invention, an apparatus for opening/closing a cover for an electric curtain, may include a driving device for the electric curtain mounted at a lower part of a withdrawal aperture of a rear package tray, wherein the cover is openably/closably mounted on the withdrawal aperture of the rear package tray, and a cover opening/closing unit disposed between the cover and a drive shaft of the driving device, allowing the cover to be opened or closed simultaneously with a driving of the driving device.

A hinge unit is hinge-coupled to a bracket mounted at one end portion of the driving device and is integrally formed under both side ends of the cover.

The apparatus may further may include a hinge pin connecting the hinge unit to the bracket, and a return spring mounted on the hinge pin to guide the cover to a closed direction by an elastic force thereof.

The cover opening/closing unit may include a driving gear connected to the drive shaft of the driving device for the electric curtain, a driven gear angularly rotatably mounted on an external frame of the driving device while engaging with the driving gear, an actuating member coaxially connected to the driven gear to actuate the cover in an opening or closing direction, and a pushing plate integrally formed on an undersurface of the cover and pushed by the actuating member to push the cover in the opening direction.

The driving gear may include a cam gear that may have an acute angle.

The driving gear may include a spur gear.

The actuating member is a circular plate, one side of which is cut into an arch shape, and one end portion that includes a push end that contacts a pushing plate.

The pushing plate may include a support bar integrally formed on the undersurface of the cover, and a opening angle control body integrally formed on a lower end of the support bar, and the opening angle control body may have a first curved groove, a second curved groove located at a lower place than the first curved groove formed on the undersurface thereof, and an edge portion protrusively formed at a boundary of the first curved groove and the second curved groove, wherein the first curved groove, the second curved groove, and the edge portion are formed contactably with a push end of the actuating member.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
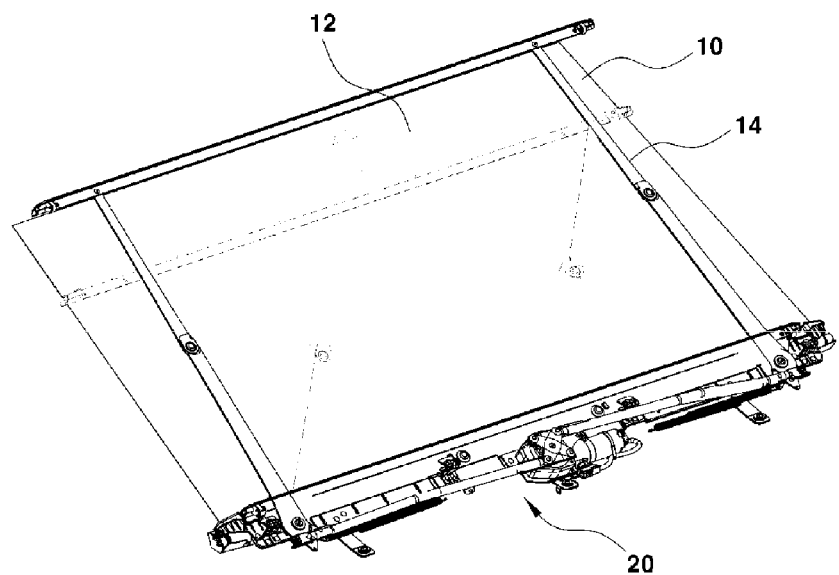
FIG. 1 is a view illustrating a link-type electric curtain.
Figure 2:
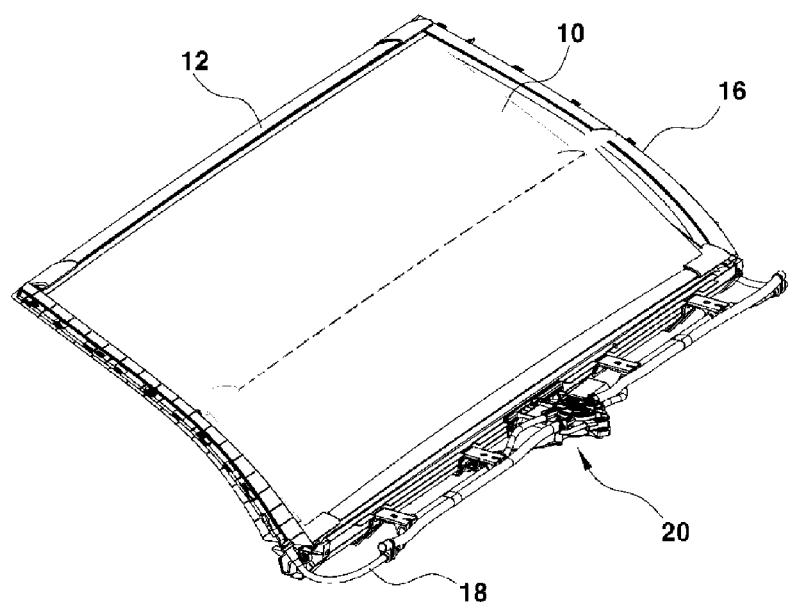
FIG. 2 is a view illustrating a wire-type electric curtain.
Figure 3:
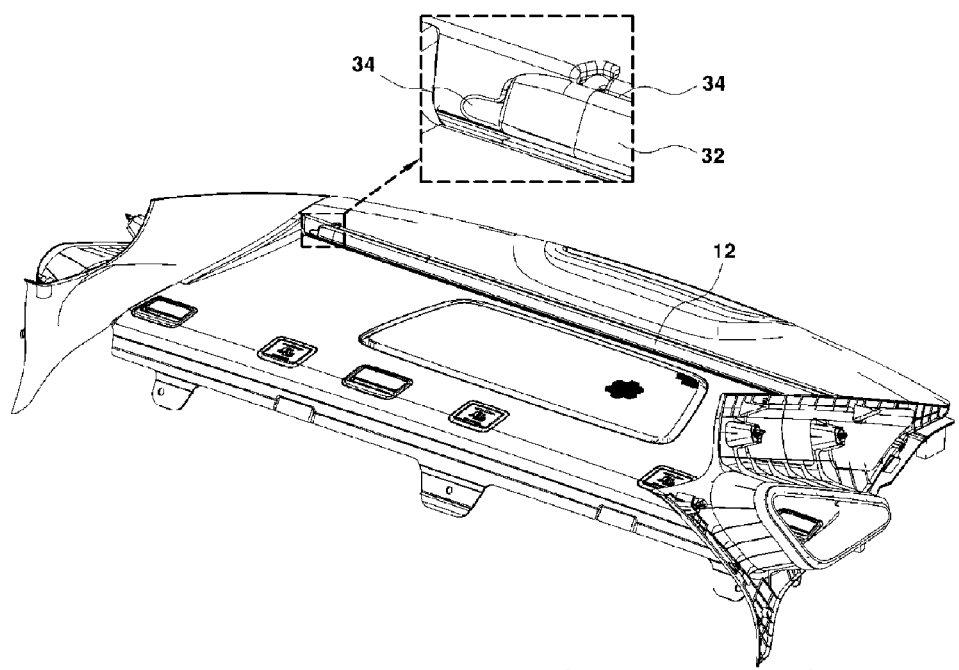
FIG. 3 and FIG. 4 are views illustrating limitations of typical electric curtains.
Figure 4:
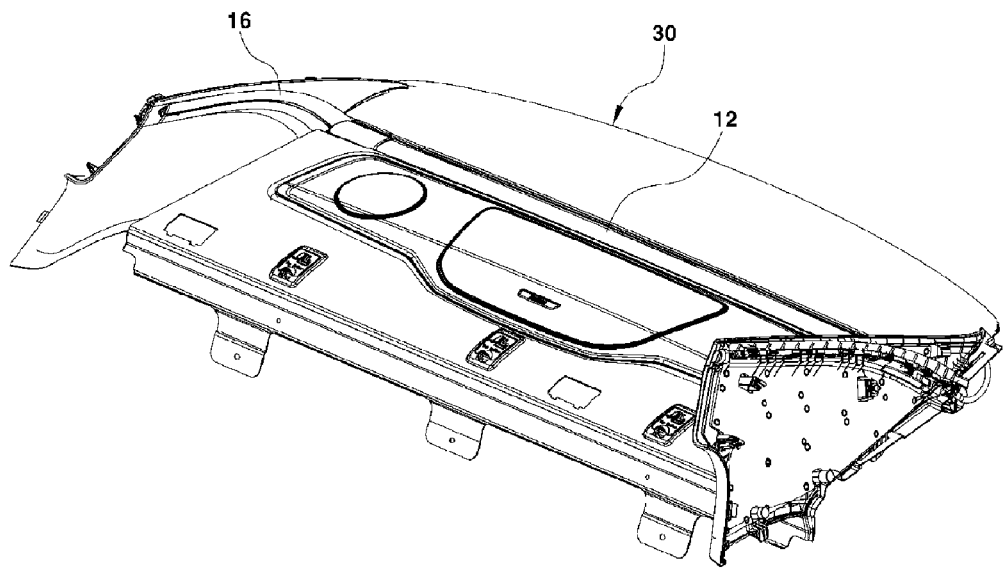

Reference numerals set forth in the Drawings includes reference to the following elements as further discussed below.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings so that those skilled in the art can easily carry out the present invention.

Figure 5:
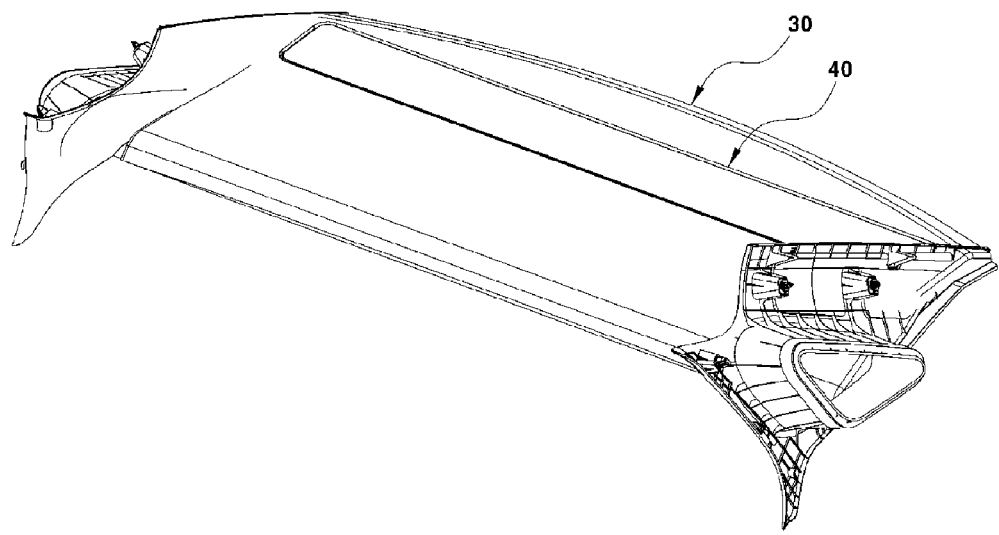
FIG. 5 is a view illustrating an exterior of a cover for an electric curtain according to an exemplary embodiment of the present invention.

FIG. 5 is a view illustrating an exterior of a cover for an electric curtain according to an exemplary embodiment of the present invention.

As shown in FIG. 5, a rear package tray 30 may have a flat one-piece structure, and a withdrawal aperture 32 for passing a curtain sheet may be longitudinally formed in the rear package tray 30 to the maximum in left and right direction.

Particularly, the withdrawal aperture 32 may be equipped with a cover 40 like a kind of door that is openable/closable. As shown in FIG. 5, when the door is closed, the surface of the cover 40 may be placed on the same plane as the surface of the rear package tray 30, allowing the electric curtain sheet to be invisible from the outside and thereby improving the exterior beauty.

Hereinafter, a configuration of an apparatus for opening/closing the cover will be described as follows.

Figure 6A:
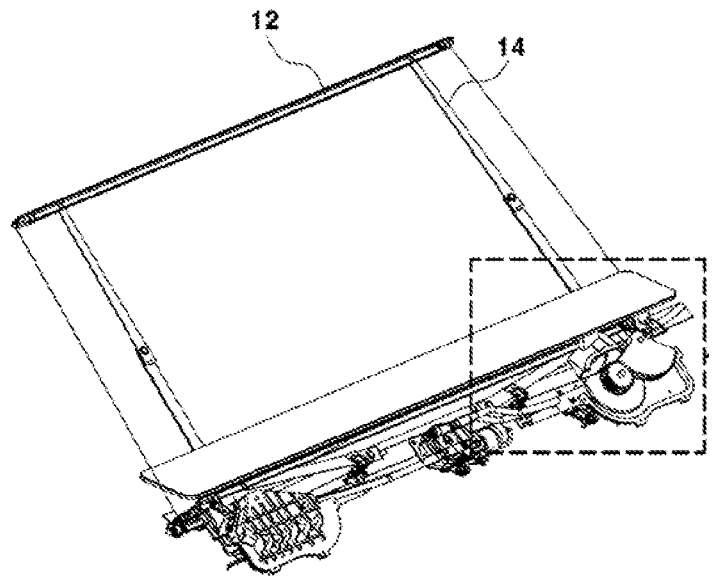
FIGS. 6A and 6B and FIG. 7 are perspective views illustrating an apparatus for opening/closing a cover for an electric curtain according to an exemplary embodiment of the present invention.
Figure 6B:
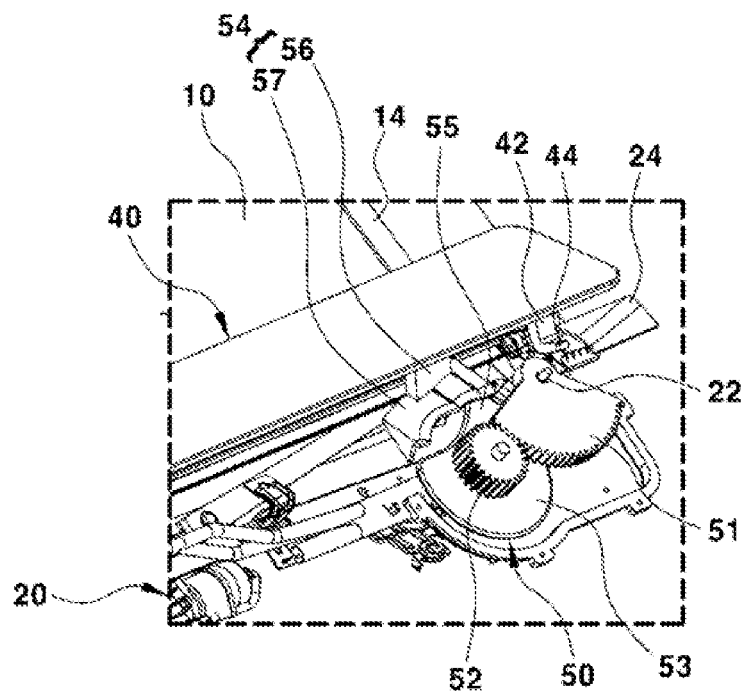
Figure 7:
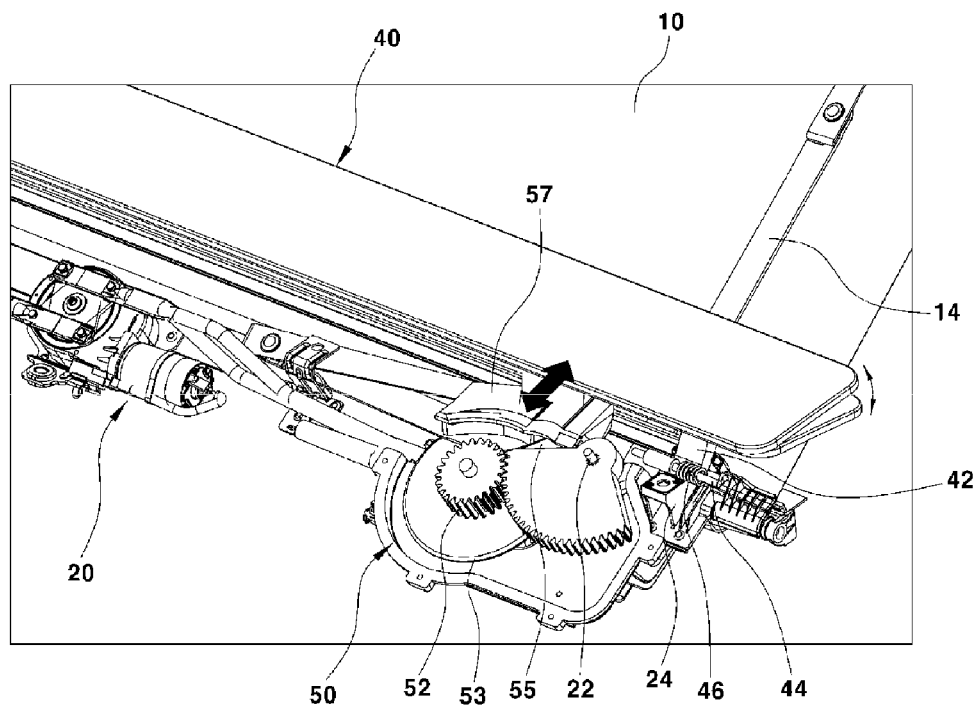

FIGS. 6A and 6B and FIG. 7 are perspective views illustrating an apparatus for opening/closing a cover for an electric curtain according to an exemplary embodiment of the present invention.

A driving device 20 for a link-type electric curtain may be installed under the withdrawal aperture 32 of the rear package tray 30, and a multi joint link 14 may be connected between a drive shaft 22 of the driving device 20 and an upper frame 12 coupled to the upper end portion of the curtain sheet 10.

In this case, the cover 40 may be openably/closably disposed on the withdrawal aperture 32, and a hinge unit 42 that is hinge-coupled to a bracket 24 mounted at one end portion of the driving device 20 by a hinge pin 44 may be integrally formed under both side ends of the cover 40.

Also, when the hinge unit 42 of the cover 40 is connected to the bracket 24 by the hinge pin 44, a return spring 46 may be fitted over the hinge pin 44 to always guide the cover 40 to a closed direction by an elastic force.

In other words, one end portion of the return spring 46 may be fixed to the hinge unit 42, and the other end of the return spring 46 may be fixed to the bracket 24, allowing the return spring 46 to be always guided to the closed direction by the elastic force when the cover 40 is opened.

Particularly, a cover opening/closing unit 50 may be disposed between the cover 40 openably/closably mounted on the withdrawal aperture 32 and the drive shaft 22 of the driving device 20 to open/close the cover 40.

The cover opening/closing unit 50 may include a driving gear 51 that is coaxially angular-rotatably connected to the drive shaft 22 of the driving device 20 in addition to the multi-joint link 14.

Also, a driven gear 52 may be angularly rotatably disposed on an external frame of the driving device 20 to engage with the driving gear 51. The driven gear 52 may also be disposed on a housing of the driving device or a certain location of a vehicle body.

The driving gear 51 may include a cam gear that has an acute angle, and the driven gear 52 may include a spur gear.

Also, as a member for actuating the cover in an opened or closed direction, an actuating member 53 may be connected to the undersurface of the driven gear 52 to form the same axis as the driven gear 52 and rotate by the same angle as the driven gear 52.

More specifically, the actuating member 53 may be a circular plate, one side of which is cut into an arch shape. One end portion that is cut may be formed into a push end 55 that slidingly contacts a pushing plate 54 integrally formed with the undersurface of the cover 40.

In this case, the pushing plate 54 may be formed on the undersurface of the cover 40 to push the cover 40 in the opening direction by being pushed by the push end 55 of the actuating member 53. The pushing plate 54 may include a support bar 56 integrally formed with the undersurface of the cover 40 and an opening angle control body 57 integrally formed with the lower end of the support bar 56.

More specifically, a first curved groove 58 and a second curved groove 59 located at a lower place than the first curved groove 58 may be formed side by side on the undersurface of the opening angle control body 57. Also, an edge portion 60 may be protrusively formed at the boundary of the first curved groove 58 and the second curved groove 59.

Thus, when the cover 40 is opened and closed, the push end 55 of the actuating member 53 may slidingly contact the edge portion 60 along the second curved groove 59 in addition to the first curved groove 58.

Hereinafter, the operation flow of the apparatus for opening/closing the cover for the electric curtain will be described as follows.

Figure 8A:
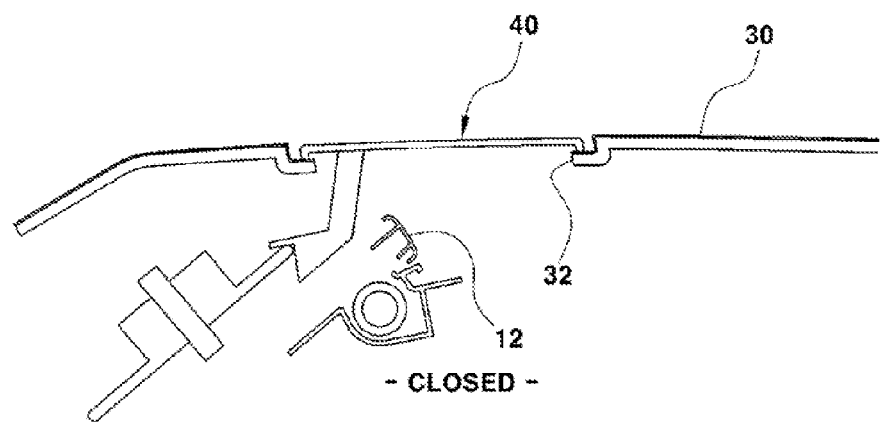
FIGS. 8A and 8B are a view illustrating an operational trace of an apparatus for opening/closing a cover for an electric curtain according to an exemplary embodiment of the present invention.
Figure 8B:
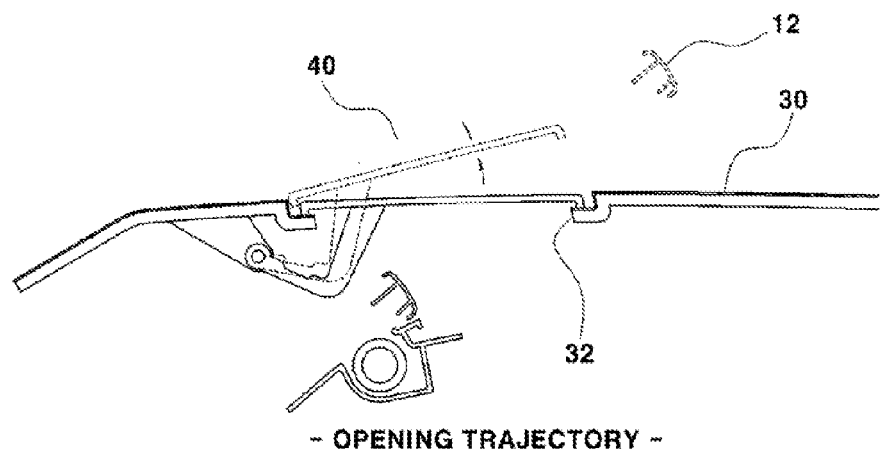

FIGS. 8A and 8B are a view illustrating an operational trace of an apparatus for opening/closing a cover for an electric curtain according to an exemplary embodiment of the present invention.

As shown in FIGS. 8A and 8B, when the electric curtain is not used, the cover 40 may be placed at the same plane as the surface of the rear package tray, covering the internal configuration to be invisible.

Figure 9:
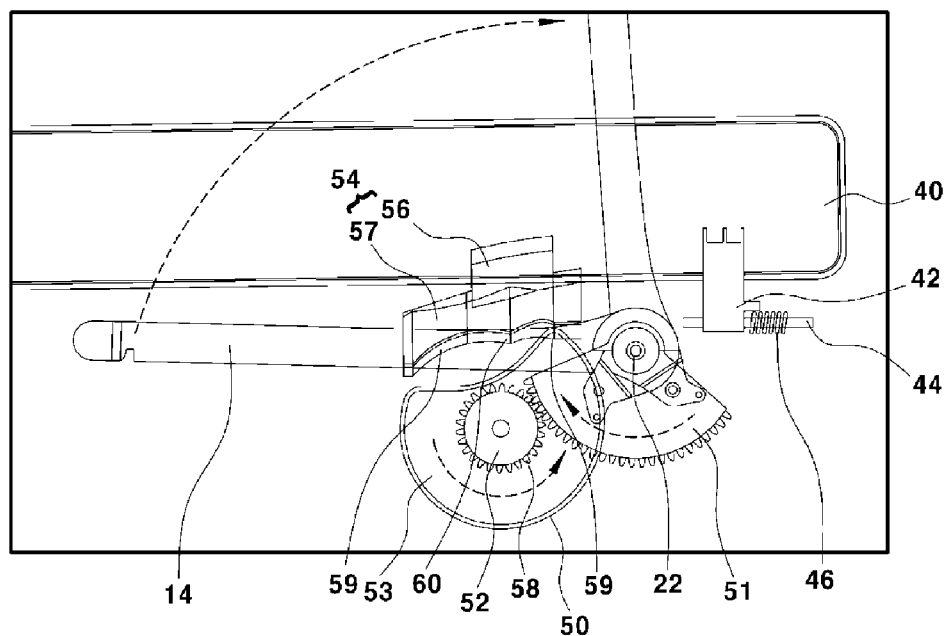
FIG. 9, FIG. 10A, FIG. 10B, FIG. 10C and FIG. 10D are views illustrating a cover opening/closing unit and its operational flow of an apparatus for opening/closing a cover for an electric curtain according to an exemplary embodiment of the present invention.
Figure 10A:
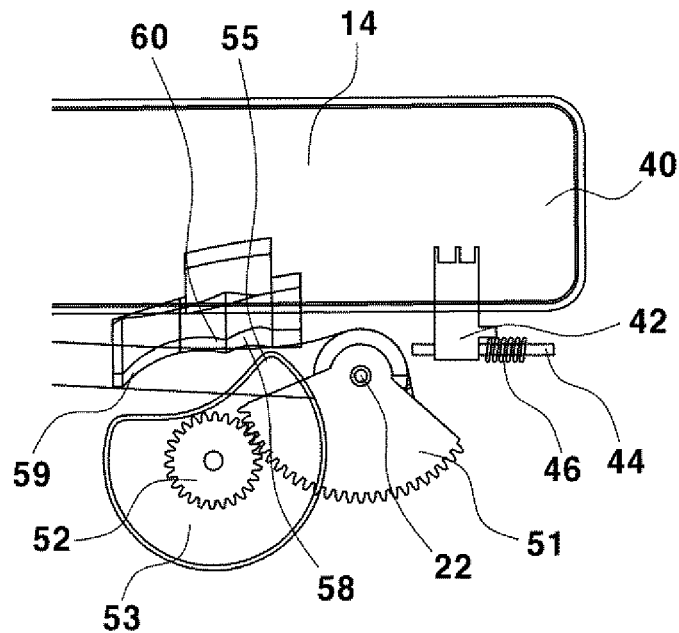

Referring to FIG. 9 and FIG. 10A, when the cover 40 is closed, the push end 55 of the actuating member 53 may be located at the first curved groove 58 of the opening angle control body 57 constituting the pushing plate 54, and the multi joint link 14 for spreading out the curtain sheet may also be horizontally arranged under the cover 40.

On the other hand, when the electric curtain is used (withdrawn), the curtain sheet may be withdrawn simultaneously with the opening of the cover 40.

As shown in the lower drawing of FIG. 8 showing the trajectory of the opening operation of the cover 40, when the cover 40 is closed, the upper frame 12 connected to the curtain sheet in addition to the curtain sheet may exist inside the rear package tray 30. At the same time as the opening of the cover 40 due to the operation of the driving device, the curtain sheet and the upper frame 12 connected to the curtain sheet may be withdrawn to the outside through the withdrawal aperture 32 to spread out.

For this, when the drive shaft 22 rotates in the opening direction due to the driving of the motor of the driving device 20, the driving gear 51 connected to the drive shaft 22 may rotate in the opening direction to deliver a turning force to the driven gear 52.

Next, the driven gear 52 may also angularly rotate in the opening direction, and simultaneously, the actuating member 53 forming the same axis as the driven gear 52 may also rotate by the same angle.

Figure 10B:
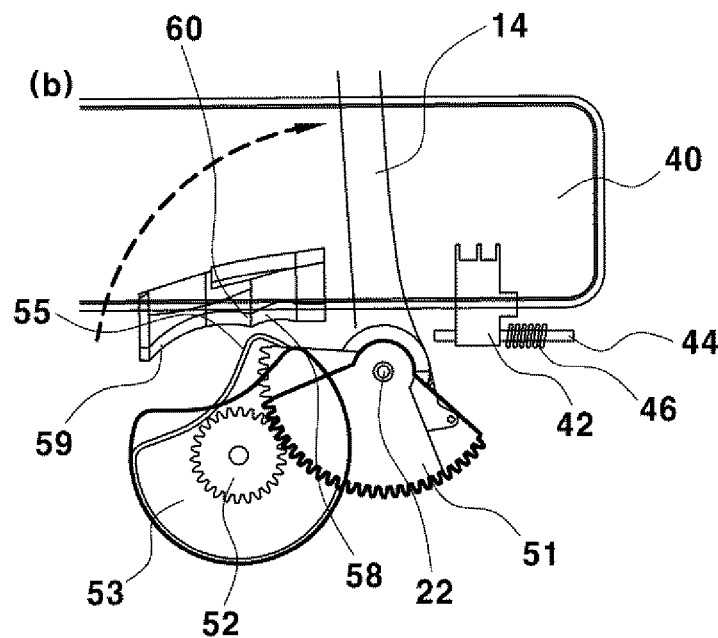

Continuously, as shown in FIG. 10B, the push end 55 of the actuating member may slide from the first curved groove of the opening angle control body 57 constituting the pushing plate 54 of the cover 40 to the edge portion 60 to push up the opening angle control body 57. Finally, in addition to the pushing plate 54 including the opening angle control body 57, the cover integrated with the pushing plate 54 may angularly rotate in the opening direction to become maximally opened.

In this case, the multi joint link 14 together connected to the drive shaft 22 may spread out through the withdrawal aperture 32 of the rear package tray 30 opened according to the opening of the cover 40 to form a vertical arrangement. Also, the upper frame 12 connected to the multi joint link 14 may be withdrawn through the withdrawal aperture 32, and simultaneously, the curtain sheet 10 connected to the upper frame 12 may spread out while covering the rear glass.

Figure 10C:
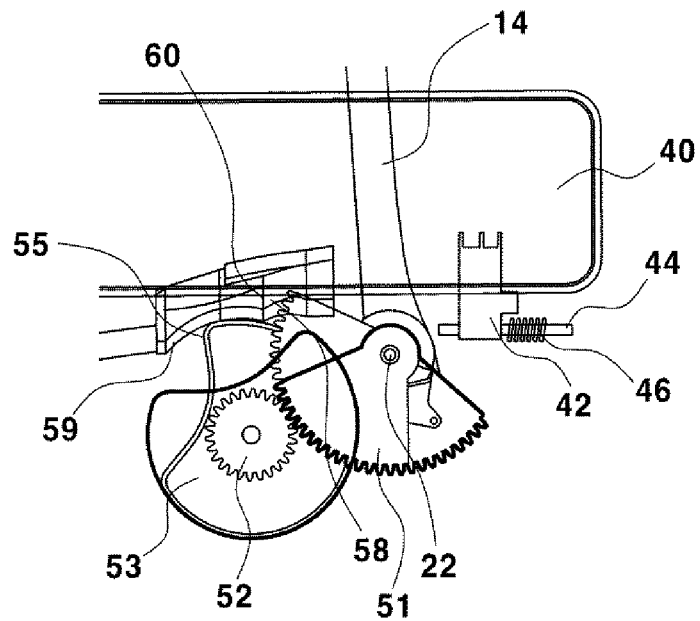
Figure 10D:
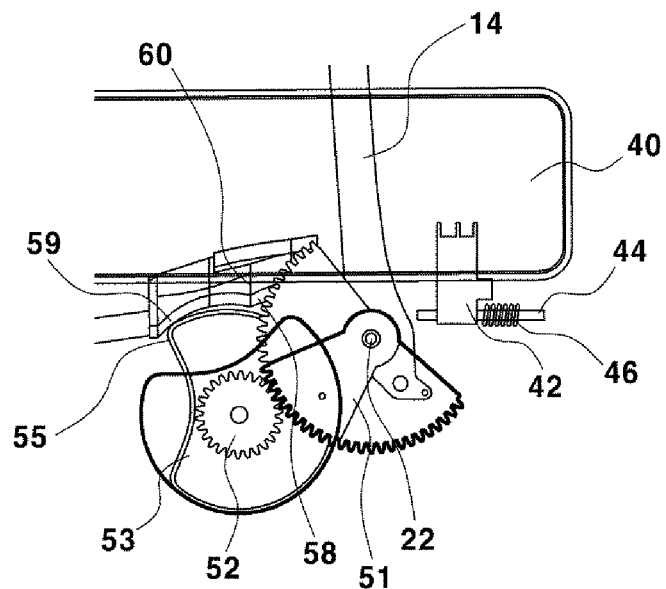

Continuously, the actuating member 53 may keep rotating, and as shown in FIGS. 10C and 10D, may move from the edge portion 60 to the second curved groove 59, maintaining the opened state of the cover 40 while supporting the pushing plate 54 including the opening angle control body 57.

Meanwhile, since the closing operation of the cover 40 proceeds in reverse order of the opening operation of the cover 40, a detailed description thereof will be omitted herein.

The present invention provides the following effects.

First, the exterior beauty of a rear package tray can be improved by openably/closably mounting a cover on a withdrawal aperture of the rear package tray and thus invisibly covering an upper frame of an electric curtain while allowing the cover to be placed on the same plane as the rear package tray when closed.

Second, since the rear package tray can be modified from a typical two-piece structure into one-piece structure having the withdrawal aperture, the number of parts and the manufacture cost can be reduced.

Third, the blocking effect of light incident through a rear glass can be maximized, by longitudinally forming the withdrawal aperture of the rear package tray to the maximum in left and right direction and maximizing the width of a curtain sheet that is withdrawn through the withdrawal aperture.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for opening and closing a cover for an electrically-driven curtain, comprising:
   a driving device for the electrically-driven curtain, wherein the driving device is mounted at a lower portion of a withdrawal aperture of a rear package tray, wherein the cover is openably or closably mounted over the withdrawal aperture of the rear package tray; and a cover opening and closing unit disposed between the cover and a drive shaft of the driving device, allowing the cover to be opened or closed with a driving of the driving device, wherein the cover opening and closing unit comprises:
- a driving gear connected to the drive shaft of the driving device for the electrically-driven curtain;
- a driven gear angularly rotatably mounted on an external frame of the driving device while engaging with the driving gear;
- an actuating member coaxially connected to the driven gear to actuate the cover in an opening or closing direction; and
- a pushing plate integrally formed on an undersurface of the cover and pushed by the actuating member, thereby pushing the cover in the opening direction, wherein the actuating member is a circular plate including:
- a first side cut into an arch shape; and
- a second side having a push end that contacts the pushing plate, and wherein the pushing plate comprises:
- a support bar integrally formed on the undersurface of the cover; and
- an opening angle control body integrally formed on a lower end of the support bar, wherein the opening angle control body has a first curved groove, a second curved groove located lower than the first curved groove, and an edge portion protruding at a boundary of the first curved groove and the second curved groove, wherein the first curved groove, the second curved groove, and the edge portion are selectively engaged with the push end of the actuating member directly.

2. The apparatus of claim 1, comprising:
a hinge unit that is hingedly-coupled to a bracket mounted at one end portion of the driving device and is integrally formed under first and second side ends of the cover.

3. The apparatus of claim 2, comprising:
a hinge pin connecting the hinge unit to the bracket; and
a return spring mounted on the hinge pin to guide the cover in a closed direction by an elastic force thereof.

4. The apparatus of claim 1, wherein the driving gear comprises a cam gear shaped as an acute angle.

5. The apparatus of claim 1, wherein the driving gear comprises a spur gear.

* * * * *